Patented Nov. 11, 1930

1,780,983

UNITED STATES PATENT OFFICE

ALBRECHT SCHMIDT, OF FRANKFORT-ON-THE-MAIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

TANNING AGENT

No Drawing. Application filed January 4, 1929, Serial No. 330,431, and in Germany September 7, 1926.

The present invention relates to new tanning agents.

I have found that emulsions which can easily be prepared from aqueous solutions of water-soluble alkyl celluloses, particularly methyl and ethyl celluloses and fatty substances of all kinds, such as train oil, rape oil, bone oil, neat's-foot oil, wool fat, tallow, vaseline, paraffin oil, etc., are most suitable for being used as tanning agents. The said emulsions may be employed for two different purposes, according to their preparation either from strongly unsaturated fatty oils, such as train oil, or from fatty substances of a feebly unsaturated or a saturated character which possess no specific tanning properties, such as rape oil, bone oil and tallow, mineral oil, lubricating oil, paraffin oil, etc. Emulsions of the first mentioned kind can advantageously be used as a tanning agent in chamoising, while emulsions of the second kind serve as a fat liquor for leathers tanned with vegetable or mineral tanning agents, and also for leathers obtained by means of a synthetic tanning material. In both cases the methyl cellulose, simultaneously used, acts not only as a particularly useful emulsifying agent on account of its being free from alkali, but also as a filling and loading agent possessing special properties of which there may above all be mentioned their great power of binding the excess of the tanning matter contained in the leather. In order to modify the action of the emulsion there may, in particular cases, also be added dyestuffs or salts or any other auxiliary substances as they are used in dyeing, such as wetting agents, dispersing agents or solvents of any kind.

The following examples serve to illustrate the invention, but they are not intended to limit it thereto, the parts being by weight:

1. An emulsion of 100 parts of train oil in 100 parts of an aqueous dimethyl cellulose solution of low viscosity and of 5 per cent strength is used for chamoising, by uniformly impregnating the unhaired skin with this emulsion. The skin is then dried in the air and the train oil allowed to oxidize, the leather is then worked up in known manner by washing it in an alkaline solution.

Owing to the protective effect of the dimethyl cellulose solution the oxydation of the train oil takes place slower than when no dimethyl cellulose is used, but it takes place much more uniformly and the plumpness of the leather is greatly increased thereby.

2. 100 parts of an aqueous dimethyl cellulose solution of 5 per cent strength, which does not coagulate unless heated to about 60° C. to 70° C., are stirred with 100 parts of neat's-foot oil until emulsification is complete. There is then effected in known manner the stuffing of the leather with this emulsion at a temperature of about 60° C.

3. 3 parts of a wetting agent, such as sodium dibutyl-naphthalenesulfonate dissolved in 20 parts of water, are added to 100 parts of an aqueous dimethyl cellulose solution of 5 per cent strength; 80 parts of mineral oil are then run, while stirring, into the mixture thus obtained. An emulsion is immediately produced which can be used for stuffing leather. Instead of the 80 parts of mineral oil there may advantageously be used a mixture of 20 parts of mineral oil and 60 parts of bone oil.

4. Into 100 parts of an aqueous dimethyl cellulose solution of 5 per cent strength is introduced, while stirring, a solution of 40 parts of wool fat in 60 parts of carbon tetrachloride. The emulsion thus obtained can also be used for stuffing leather.

5. In 100 parts of an aqueous methyl cellulose solution of 3 per cent strength is emulsified a mixture of 40 parts of train oil and 10 parts of egg-yolk, while adding 0.2 part of sulfurized train oil.

The leather treated with this emulsion is particularly full and plump.

By the term "fatty substances" in the following claims there are to be understood substances such as train oil, rape oil, bone oil, neat's-foot oil, wool fat, tallow, vaseline, paraffin oil, etc.

I claim:

1. As a new product, a tanning agent consisting of an emulsion of an animal fat in an aqueous dimethyl cellulose solution.

2. As a new product, a tanning agent consisting of an emulsion of train oil in an aqueous dimethyl cellulose solution.

3. As a new product, a tanning agent consisting of an emulsion of 100 parts of train oil in 200 parts of an aqueous dimethyl cellulose solution of 5 per cent strength.

4. As a new product, a tanning agent consisting of an emulsion of a fatty substance in an aqueous solution of a water-soluble alkyl cellulose.

5. As a new product, a tanning agent consisting of an emulsion of an animal fat in an aqueous solution of a water-soluble alkyl cellulose.

6. As a new product, a tanning agent consisting of an emulsion of train oil in an aqueous solution of a water-soluble alkyl cellulose.

7. As a new product, a tanning agent consisting of an emulsion of an animal fat in an aqueous solution of a methyl cellulose.

8. As a new product, a tanning agent consisting of an emulsion of train oil in an aqueous solution of a methyl cellulose.

In testimony whereof, I affix my signature.

ALBRECHT SCHMIDT.